M. SCHLESINGER-THURY.
FLOUR SIFTER.
APPLICATION FILED FEB. 13, 1913.
1,103,328.
Patented July 14, 1914.
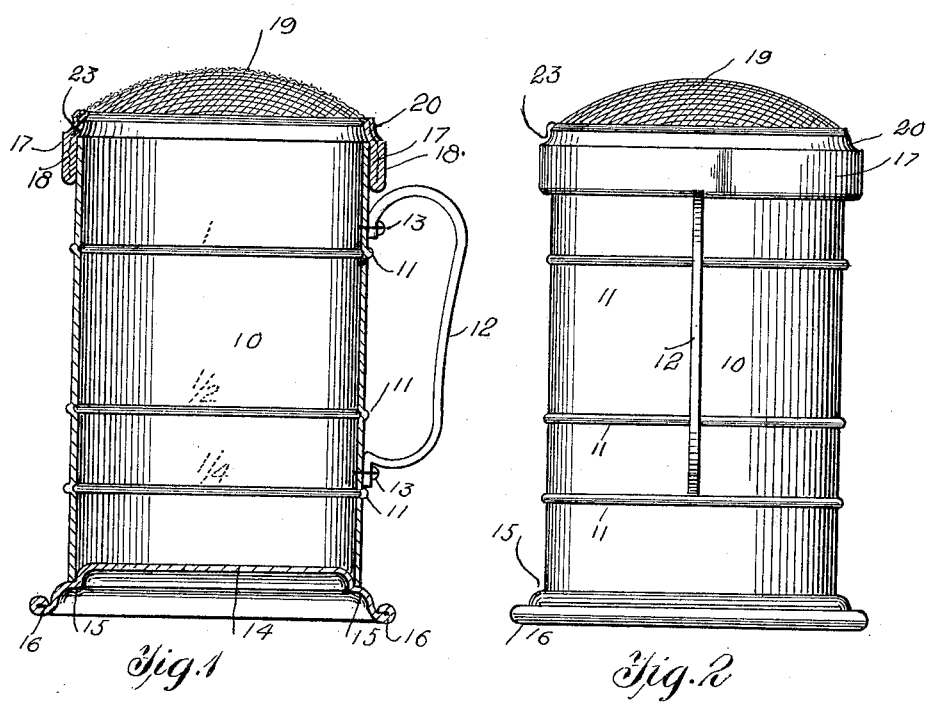
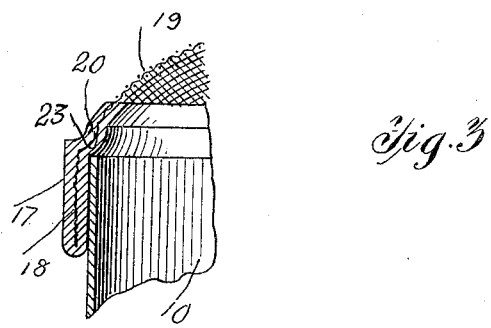
WITNESSES
INVENTOR

UNITED STATES PATENT OFFICE.

MARIE SCHLESINGER-THURY, OF BERKELEY, CALIFORNIA.

FLOUR-SIFTER.

1,103,328.

Specification of Letters Patent. Patented July 14, 1914.

Application filed February 13, 1913. Serial No. 748,218.

*To all whom it may concern:*

Be it known that I, MARIE SCHLESINGER-THURY, a citizen of the Republic of Switzerland, residing at Berkeley, in the county of Alameda and State of California, have invented new and useful Improvements in Flour-Sifters, of which the following is a specification.

It is the object of the present invention to provide an improved flour sifting utensil, one wherein the elements of simplicity and durability are obviously displayed.

The primary object of my invention relies in the production of a device of this character which not only serves as a sifting device but also provides means whereby the quantity of its contents may be readily ascertained.

The simple construction and arrangement of parts enables the device to be quickly dismembered consequently the same may always be kept in a sanitary condition.

In making pastry or bread for the household, it is always tedious to have to weigh the flour (generally one pound, more or less) and sift it, this requiring several vessels and two separate manipulations. In using my invention, the quantity of flour is ascertained immediately after being disposed therein, and when emptied, is automatically sifted.

Instead of providing a perforated plate for sifting the flour, a section of wire mesh is provided, which allows the flour to pass freely and fall in a cloud on the dough. Further means in the form of annular rings are provided on the body portion of the device, the same indicating the capacity of the body portion therebelow so that the quantity of the contents may be readily ascertained.

With the above and other objects in view, my invention relates to such details of construction combination and arrangements of parts as will be hereinafter more fully described and specifically pointed out in the appended claims.

In describing my invention in detail, reference will be had to the accompanying drawings wherein like characters denote like or corresponding parts throughout the several views, and in which; Figure 1 is a vertical sectional view of the device illustrating the body portion in elevation, Fig. 2 is a rear elevation of the receptacle, Fig. 3 is a fragmentary view thereof.

In the accompanying drawings wherein is shown the preferred embodiment of my invention the numeral 10 designates the tubular body portion thereof, normally open at its respective ends as illustrated. This body portion as is shown in the drawings is preferably constructed of metal or the like consequently it will have a neat appearance and be very compact in form.

Provided throughout the body portion, and at certain predetermined points thereof are a plurality of peripheral annular rims 11, illustrating the capacity of the body portion below the ring. As indicated in the drawings, the rings designate $\frac{1}{4}$, $\frac{1}{2}$ and 1 pound.

For purpose of manipulating the body portion during the several operations presently mentioned, a handle 12 is provided, the extremities of the latter being secured thereto as shown at 13. Further, I have provided a suitable base plate 14 constructed of any desired metal, the same being bent about its edge to form a comparatively horizontally disposed supporting shoulder 15, the latter being engaged by the lower portion of the body as illustrated. From the shoulder 15 the base plate is bent downwardly and rolled as at 16 to form a suitable foot member for supporting the body portion when not in use.

As set forth above, I have provided a section of wire mesh for inclosing the upper end of the body portion and providing means whereby the contents thereof may be sifted. With this in view, I have provided a collar formed from a sheet member bent intermediate its ends to form a pair of annular sections 17 and 18, the latter being secured together at their lower ends as shown and clamping the edge of the section of wire mesh 19 for holding the same about the top of the body. The outer edge portions of the sections 17 and 18 are bent inwardly to form a flange 20, extending about the periphery of the body portion to limit the movement of the collar upon the body portion. This inturned flange also forms means for securely clamping the wire between the sections 17 and 18.

From the above description it will be recognized that the device may be dismembered very quickly thus enabling each part to be cleaned independent of one another whereby the device may always be kept in a sanitary condition.

I desire to lay the greatest of stress upon the simplicity of the device in view of the fact that it may be manufactured and placed upon the market at a minimum cost.

Such changes as are permissible by the subjoined claims may be resorted to without departing from the spirit of my invention.

Having thus fully described my invention, what I claim as new and desire to secure by Letters Patent is:

1. A device of the character described comprising a body portion open at one end, and a closure for said body portion comprising a collar fitting about the open end of said body portion and formed from a single strip of material bent longitudinally to form inner and outer clamping members, a mesh covering having its edge portion positioned between the clamping members of said collar, and the outer edge portion of said collar being bent inwardly to form a flange securely holding said mesh between the clamping members of said collar and limiting the longitudinal movement of said collar upon said body portion in one direction.

2. A device of the character described comprising a body portion open at one end, a collar surrounding the open end of said body portion and provided with clamping members, a mesh having its edge portions positioned between the clamping members of said collar and extending across the open end of said body portion, and common means for securely holding said mesh between the clamping members of said collar and limiting longitudinal movement of said collar upon said body portion in one direction.

MARIE SCHLESINGER-THURY.

Witnesses:
B. K. DENBIGH,
KATIE MAE BEASLEY.

---

Copies of this patent may be obtained for five cents each, by addressing the "Commissioner of Patents, Washington, D. C."